(12) United States Patent
Lassig et al.

(10) Patent No.: US 6,229,846 B1
(45) Date of Patent: May 8, 2001

(54) APPARATUS AND METHOD FOR IMPLEMENTING HIGH SPEED MODEM COMMUNICATION SUPPORT

(75) Inventors: Mark Alan Lassig, Naperville; Carl Robert Posthuma, Wheaton, both of IL (US)

(73) Assignee: Lucent Technologies, Inc., MurrayHill, NJ (US)

(*) Notice: Subject to any disclaimer, the term of this patent is extended or adjusted under 35 U.S.C. 154(b) by 0 days.

(21) Appl. No.: 09/371,282

(22) Filed: Aug. 10, 1999

(51) Int. Cl.[7] ............................... H04B 1/38; H04L 5/16
(52) U.S. Cl. .................... 375/222; 379/93.09; 379/93.08
(58) Field of Search ..................................... 375/222, 240, 375/241, 249; 370/465, 468, 477, 433, 435; 379/399, 93.05, 93.06, 93.07, 93.08, 93.09, 93.01

(56) References Cited

U.S. PATENT DOCUMENTS

| | | | |
|---|---|---|---|
| 5,365,577 | * 11/1994 | Davis et al. | 379/93.17 |
| 5,801,695 | 9/1998 | Townshend | 375/340 |

* cited by examiner

Primary Examiner—Don Vo
Assistant Examiner—Phuong Phu
(74) Attorney, Agent, or Firm—Walter W. Duft

(57) ABSTRACT

A system and method are disclosed for implementing support for increased communication speed between data communication devices, including one or more high speed analog modems, connected to a digital communication network. The high speed analog modems communicate with the digital communication network via analog signaling pathways that also support voice communication across the digital communication network. Following the initiation of communication between an originating communication device and a terminating communication device connected to the digital communication network, determination is made as to whether the communication devices include at least one high speed analog modem and another data communication device capable of communicating at the increased data communication speed. If so, adjustment is made, as necessary, to the filtering present on the analog signaling pathway between the digital communication network and the analog modem to increase the analog signaling bandwidth that can be carried thereon. Data communication speed is further increased by implementing a companding mode that is substantially linear across the voltage range of the analog signals being sampled, or in which larger quantization spacings are used for lower voltage levels than for higher voltage levels.

21 Claims, 4 Drawing Sheets

APPARATUS AND METHOD FOR IMPLEMENTING HIGH SPEED MODEM COMMUNICATION SUPPORT

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to modem communications. More particularly, the invention pertains to a system and method for supporting high speed, bi-directional analog modem communications at a data rate of substantially 64 Kbps. Still more particularly, the invention concerns a line card providing an interface between an analog modem and a digital transmission network, such as the digital portion of the Public Switched Telephone Network (PSTN).

2. Description of the Prior Art

Considerable attention has been directed toward increasing the data transfer rates of analog modems communicating over conventional local loop POTS (Plain Old Telephone Service) lines. In accordance with the V.90 standard currently in use, the maximum data rate for analog modems operating in the downlink direction (server to client) is 56 Kbps. In the up-link direction (client to server), the current maximum data rate is 33.6 Kbps.

Several factors limit analog modem technology to these speeds. First, filtering implemented at the line card interface between the local loop and the digital portion of the PSTN restricts available bandwidth to approximately 3000 Hz. Second, FCC regulations impose a maximum power limit of −9 dBm for analog signals carried on POTS lines terminating at RJ-11 jacks. This power limit reduces signal to noise ratios and also impairs the detection and processing of high frequency signal components, which are attenuated by filter-induced roll-off. Third, the analog-to-digital conversion and i-law or A-law companding performed by the line card CODEC (enCODer/DECoder), which is intended to reduce quantization noise, limits the CODEC's ability to use more than seven bits of each eight bit PCM codeword for the digital-to-analog conversion performed in the downlink direction. Conventional companding, moreover, has failed to increase the quantization error signal-to-noise floor above approximately 38–42 dB.

Accordingly, there is a need in the modem communication art for increased analog modem speed, in both the up-link and downlink directions. What is required is a system and method that improves signal processing efficiency at the interface between an analog modem and a digital transmission network to which it is connected in order to provide high speed, bi-directionally symmetrical modem communication. In a digital telephone system implementing 64 Kbps PCM codeword transmission, an improved line card at the local switch is indicated, such that bi-directional 64 Kbps analog modem communication may be facilitated on the local loop.

SUMMARY OF THE INVENTION

A system and method in accordance with the invention provide support for increased communication speed between data communication devices connected to a digital communication network, including analog modems communicating with the digital communication network via analog signaling pathways that may also support voice traffic. Following the initiation of network communication between two such data communication devices, determination is made whether the communication devices include at least one analog modem and another data communication device capable of communicating at the increased data communication speed. If so, adjustment is made, as necessary, to the filtering present on the analog signaling pathway between the digital communication network and the analog modem in order to provide increased analog signaling bandwidth.

Analog signals sent by the transmit side of the analog modem are converted to digital form by an Analog-to-Digital Converter (ADC) and compressed by a compression circuit for transmission as digital codewords over the digital communication network. The compression profile is preferably linear so that the digital codewords correspond to equally spaced voltage levels throughout the range of voltages sampled by the ADC. Alternatively, a nonlinear compression profile can be implemented in which fewer digital codewords are used to represent lower voltage levels than for higher voltage levels. In the receive direction, digital data signals carried across the digital communication network are expanded by an expansion circuit in inverse proportion to the aforementioned compression profile and converted to analog form by a Digital-to-Analog Converter (DAC) for transmission across the analog signaling pathway.

In preferred aspects of the invention, the digital communication network carries PCM codewords at a rate of 64 Kbps (per the DS0 standard), and the analog modem transmits and receives Pulse Amplitude Modulated (PAM) analog signals in synchronization therewith. The determination as to whether high speed data communication is possible preferably includes a first determination of whether the communication devices include an analog modem and another data communication device, and a second determination of whether the analog modem and data communication device are capable of communicating at the increased data communication speed. The first determination may include detecting a modem tone being exchanged between the communication devices. The modem tone could be a tone for disabling echo cancellation in the analog pathway or any other suitable signal. The second determination may include detecting a signal sent by one or both communication devices indicating that 64 Kbps communication has been negotiated. Alternatively, the second determination could include detecting a signal sent by one of the communication devices that is indicative of the other communication device being unable to support the increased data communication speed (e.g., it is not accepting a 64 Kbps communication request). The filter adjustment preferably includes disabling analog filtering used during voice communications over the analog signaling pathway, or at least disabling any analog filtering on the analog signaling pathway that prevents an analog signaling bandwidth of at least approximately 4000 Hz. The encoding of analog signals to digital form and the subsequent compression thereof preferably includes sampling the analog signals using, by way of example only, a twelve to sixteen bit encoding scheme followed by compressing the samplings into eight bit PCM codewords according to the selected compression profile. The expanding and subsequent decoding of digital signals to analog form preferably includes converting the eight bit PCM codewords carried on the digital network into, by way of example only, twelve to sixteen bit codewords in inverse proportion to the compression profile, and converting these expanded codewords into discrete PAM voltage levels that substantially correspond to the PCM codeword quantization levels.

In a most preferred embodiment, the invention is implemented using a line card interface between the analog signaling pathway(s) and the digital communication network.

BRIEF DESCRIPTION OF THE DRAWING

The foregoing and other features and advantages of the invention will be apparent from the following more particular description of a preferred embodiment of the invention, as illustrated in the accompanying Drawing, in which.

DETAILED DESCRIPTION OF THE PREFERRED EMBODIMENT

Figure 1:
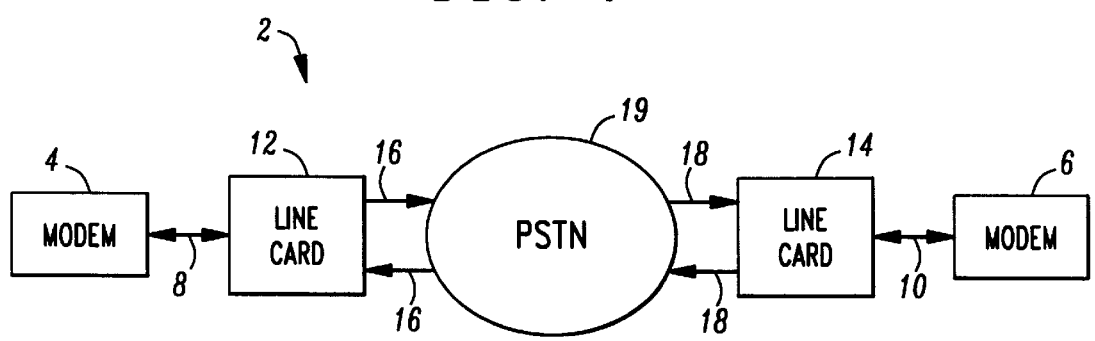
FIG. 1 is a functional block diagram showing a telecommunication system configured in accordance with the invention.

Turning now to the figures, wherein like reference numerals represent like elements in all of the several views, FIG. 1 illustrates an exemplary telecommunication system 2 that is configured, according to a preferred embodiment of the invention, in a telephone system. The telecommunication system 2 facilitates data communication between a pair of 64 Kbps analog modems 4 and 6. Each modem 4 and 6 is respectively connected via a local loop POTS line 8 and 10 to a respective line card 12 and 14 operating in association with a Central Office (CO) switch (not shown). Each POTS line 8 and 10 may be implemented using a single twisted pair wire, as is conventional, or any other suitable signal carrying medium. The line cards 12 and 14 respectively connect via CO switching circuitry (not shown) and digital trunks 16 and 18 to the PSTN 19. As is conventional, each trunk 16 and 18 can be implemented using two twisted pair wires, one for each signal direction. Other signal carrying media, such as fiber optic cabling, may also be used depending on network configuration specifics.

In an alternative arrangement (not shown), one of the modems could be an analog modem and the other could be digital modem connected directly to the PSTN via digital (e.g., PRI) trunks. This is a common arrangement implemented by Internet Service Providers and enterprise remote access networks through the use of Remote Access Servers (RAS). In a still further arrangement, one of the modems could be an analog modem and the other could be an ISDN modem connected to the PSTN via a digital BRI line. This could occur, for example, in the case of an individual using a portable computer having an analog modem to dial up the individual's home computer having an ISDN modem, in order to exchange data.

Figure 2:
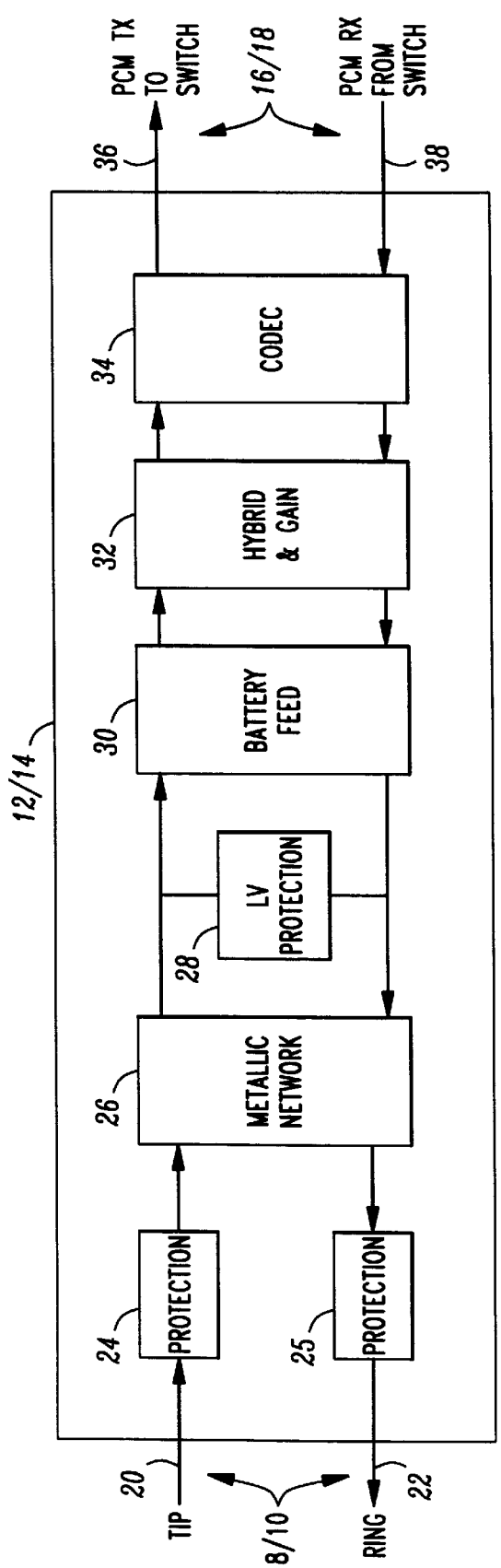
FIG. 2 is a functional block diagram showing a telephone line card constructed in accordance with the invention.

Turning now to FIG. 2, the line cards 12 and 14 are shown in more detail. Each line card 12 and 14 receives analog signals from its respective modem 4 or 6 on tip 20, which is conventionally provided by the POTS lines 8 and 10. Each line card 12 and 14 transmits analog signals to its respective modem 4 or 6 on ring 22, which is also conventionally provided by the POTS lines 8 and 10. As is conventional, the analog signals pass through high voltage surge protection circuits 24 and 25 that are respectively connected on one side thereof to tip 20 and ring 22. The other side of each high voltage protection circuit 24 and 25 is connected to a metallic network 28, which contains relays and other circuit components for local loop testing and, in some cases, line card diagnostic evaluation. The metallic network 26 is also connected to low voltage protection circuitry 28 that prevents damage to the line card solid state components.

As is further conventional, tip 20 and ring 22 receive local loop power from a battery feed circuit 30. A conventional hybrid-and-gain circuit 32 is additionally provided to match the analog signals respectively carried on tip 20 and ring 22 to the analog signals carried on the transmit and receive signal pathways 36 and 38 provided by the four-wire trunks 16 and 18. Depending on the circuit components used, the hybrid-and-gain circuit 32 may either be connected to, or integrated as part of, a CODEC 34.

Figure 3:
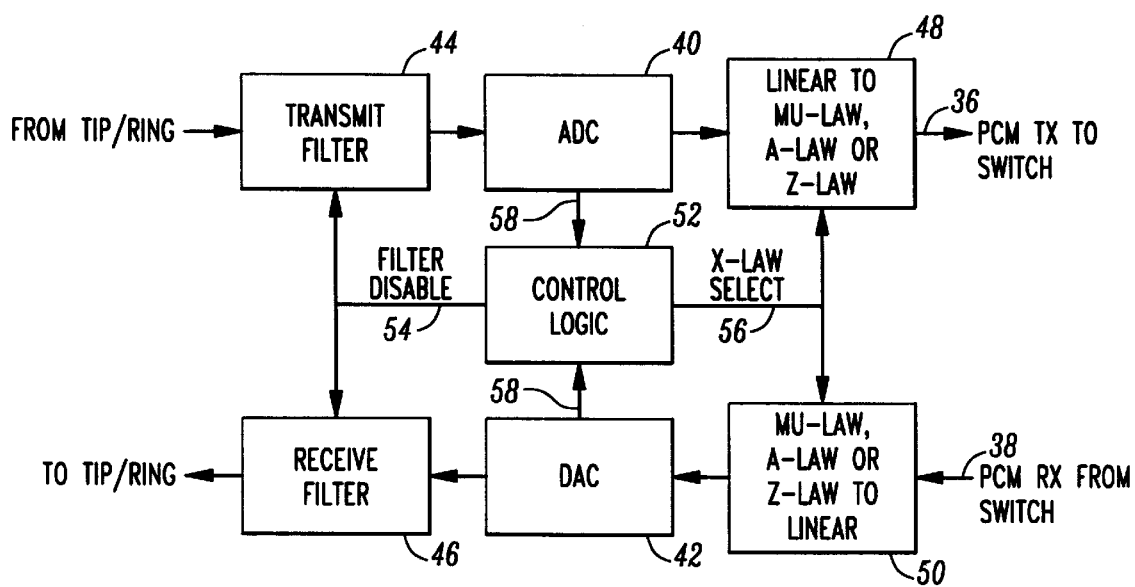
FIG. 3 is a functional block diagram showing details of the CODEC contained in the line card of FIG. 2.

Turning now to FIG. 3, the CODEC 34 includes the usual Analog-to-Digital Converter (ADC) 40 and Digital-to-Analog Converter (DAC) 42. The CODEC 34 further includes the usual transmit filter 44 and receive filter 46 for bandpass limiting the analog signals carried on tip 20 and ring 22. As is conventional, the filters 44 and 46 provide signal attenuation below approximately 300 Hz and above approximately 3300 Hz.

A compression circuit 48 and an expansion circuit 50 are provided in the CODEC 34 to perform the usual (i-law and A-law) companding operations. More specifically, the compression circuit 48 contains a look-up table for converting between the uncompressed (e.g., twelve-sixteen bit) digital code words processed by the ADC 40 and the compressed eight bit PCM codewords carried over the PSTN 19. Similarly, the expansion circuit 50 contains a look-up table for converting between the compressed eight bit PCM codewords carried over the PSTN 19 and the uncompressed (e.g., twelve-sixteen bit) digital code words processed by the DAC 42. As is conventional, these companding operations are performed such that the quantization spacings between low voltage signals are smaller than for large voltage signals. As is also conventional, each circuit 48 and 50 could be provided with both $\mu$-law and A-law conversion tables and configured so as to be selectively programmable to invoke either companding mode.

In accordance with the invention, the circuits 48 and 50 are programmable and each further includes an additional look-up table to respectively provide linear compression and s expansion of the digital signals received from the ADC 40 and provided to the DAC 42. When the programmable circuits 48 and 50 are placed in the linear companding mode, PCM codewords on the compression side of each circuit correspond to evenly spaced quantization levels throughout the range of analog voltages transmitted and received by the analog modems 4 and 6. This linear companding will sometimes be referred to hereinafter as "$Z_1$-law" companding. Additionally, a nonlinear "inverse" companding table could be provided wherein the spacings between quantization levels are larger for smaller voltages than for larger voltages. This nonlinear inverse companding mode will sometimes be referred to hereinafter as "$Z_2$-law" companding and may be useful, by way of example, in high noise environments. In practice, it may be desirable to implement several "$Z_x$-law" tables to provide a variety of linear and nonlinear inverse companding modes than can be selected in accordance with prevailing line conditions. In all cases, additional benefit may be achieved if the control logic 52 is programmed to determine the usable analog voltage range and to space the quantization levels within that range. For example, the lower end of the usable voltage range could be determined from the noise level present on the analog line. The upper end of the usable voltage range could be determined from the limits put on signal power by the FCC or international equivalents. In this way, the range over which the signal can be spread is established and the quantization levels can be spaced accordingly over that bounded range. This range can be communicated with the associated modem so that its power levels may be adjusted accordingly.

In operation, the CODEC 34 provides the usual line filtering during voice communications that restricts the analog bandwidth on the POTS lines 8 and 10 to approximately 300–3300 Hz. Also for voice communications, the CODEC 34, and specifically the programmable circuits 48 and 50, are configured to implement the usual $\mu$-law or A-law companding modes. When 64 Kbps modem communication is desired, the transmit and receive filters 44 and 46 are disabled and the programmable circuits 48 and 50 are placed in a $Z_x$-law companding mode. As described in more detail below, control logic 52 performs the necessary control functions to switch between the voice communication mode and the high speed data communication mode. The control logic 52 is connected via a control line 54 to the transmit and receive filters 44 and 46. This control line carries filter disable/enable signals generated by the control logic 52 for respectively disabling and enabling (fully or partially) the transmit and receive filters 44 and 46. The control logic 52 is connected via a control line 56 to the programmable circuits 48 and 50. This control line carries X-law select signals generated by the control logic 52 for selecting between the $\mu$-law, A-law and $Z_x$-law tables in the programmable circuits 48 and 50. Control inputs 58 provide information that is used by the control logic 52 to change the line card operational mode. Persons skilled in the art will appreciate that control logic 52 may be implemented in software, firmware or hardware.

In conventional line cards, the goal of $\mu$-law and A-law companding is to produce less quantization error (quantization noise) relative to lower voltage signal components, such that low-voltage signal-to-noise ratios are improved. Notwithstanding such companding, the maximum achievable signal-to-noise ratio for analog modem communications through existing line cards is approximately 38–42 dB. This limitation, coupled with the bandwidth limitation imposed by conventional line card filtering, limits current modem uplink speeds to approximately 33.6 Kbps.

In the digital-to-analog direction, the use of $\mu$-law and A-law companding means that some of the PCM codewords correspond to closely spaced low voltage signal components. Because it is difficult to convert such codewords to signals that can be properly detected in the presence of noise, current modem transmission standards allow the least significant codeword bit to be dropped. This effectively reduces the number of codewords from 256 to 128, thus limiting the maximum downlink data rate to 56 Kbps.

In the improved CODEC 34, the linear $Z_1$-law companding mode implemented by the programmable circuits 48 and 50 results in the digital codewords corresponding to evenly spaced quantization increments. To minimize quantization noise resulting from the analog-to-digital conversion, and to achieve a 64 Kbps data rate, the modems 4 and 6 are preferably configured to transmit and receive PAM signals in synchronization with the line card sampling clocks. This is in contrast to conventional analog modems and line cards that exchange Quadrature Amplitude Modulated (QAM) signals in both the uplink and downlink directions. In the up-link direction, the PAM signals are generated so that each voltage level corresponds to one of the 256 quantized sampling levels represented by the PCM codewords produced by the compression circuit 48. In the down-link direction, the analog signals sent to the modems 4 and 6 are sampled by the modems at voltages that correspond to the 256 quantization levels represented by the PCM codewords received at the expansion circuit 50. Such synchronization schemes have been proposed in the prior art, and are discussed, by way of example, in U.S. Pat. No. 5,801,695 of Townshend.

With quantization noise being reduced in the up-link direction, signal-to-noise ratios are improved and the data rate can be increased beyond 33.6 Kbps to 64 Kbps (assuming the line card filters are also disabled). In the downlink direction, the quantization spacings for low voltage signal components are larger than they would be with $\mu$-law or A-law companding. This ensures that low voltage codewords can be converted to analog signals that are readily detectable despite the presence of noise. All 256 PCM codewords can be effectively converted to analog signals, such that the 64 Kbps data rate is achieved.

Figure 4:
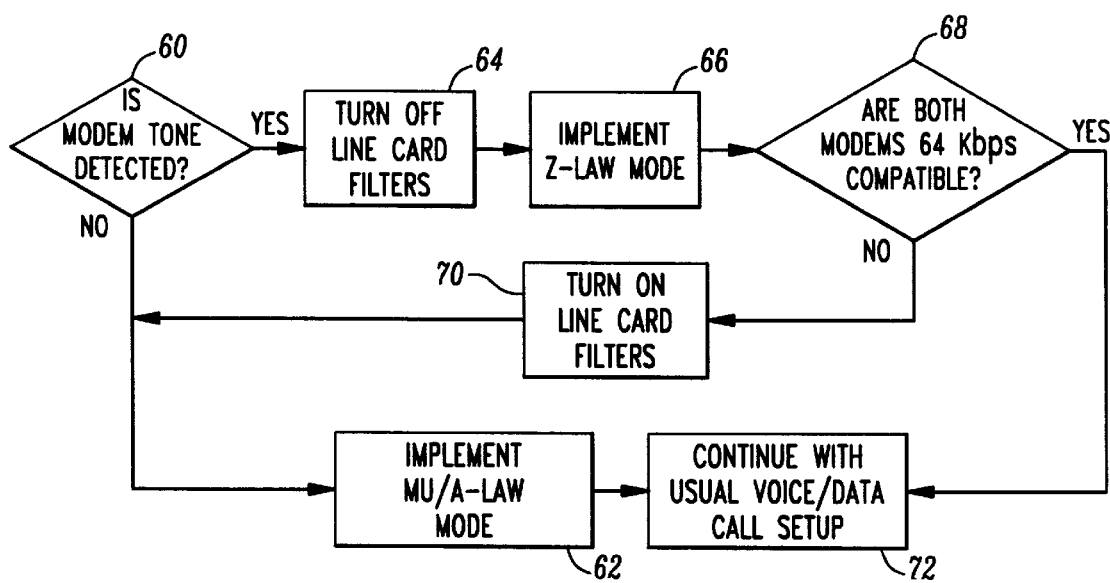
FIG. 4 is a flow diagram showing method steps performed in accordance with the invention during a call from one data communication device to another, with provision being made for implementing high speed communications on behalf of data communication devices that are so equipped and normal voice or data communications on behalf communication devices that are not equipped for high speed data communication.

Turning now to FIG. 4, a high level flow diagram illustrates the overall control functions implemented by control logic 52 in the CODEC 34 to switch between voice support and 64 Kbps modem support. As shown therein, when a call is initiated, the control logic 52 monitors its inputs 58 in step 60 to determine whether a modem tone (such as a 2100 Hz echo cancellation disablement signal) has been exchanged, indicating that a modem-to-modem connection has been made. If no modem tone is detected, indicating that the connection is between voice equipment, the analog line signals are PCM encoded and compressed using conventional $\mu$-law or A-law compression in step 62. In the receive direction, conventional $\mu$-law or A-law expansion and decoding are performed.

If a modem tone is detected in step 60, step 64 is implemented and the control logic 52 sends a signal on the control line 54 to disable the transmit and receive line card filters 44 and. 46. In step 66, the control logic 52 then sends a signal on the control line 56 instructing the programmable circuits 48 and 50 to perform linear-to-Z-law and Z-law-to-linear companding, respectively. In step 68, the control logic 52 checks it inputs 58 to determine whether both modems support 64 Kbps data communication. By way of example only, this could be a signal indicating that the modems are capable of 64 Kbps communication. Alternatively, there could be a signal indicating that the modems are unable to negotiate a 64 Kbps connection. More particularly, if one of the modems supports 64 Kbps communication while the other does not, the 64 Kbps modem could send a tone indicating that the other modem is not accepting the 64 Kbps connection request. If this signal is detected, the line filters 44 and 48 are re-enabled in step 70 and the programmable circuits 48 and 50 are reset in step 62 to perform the normal $\mu$-law or A-law companding. The usual call setup is then performed in step 72 after a companding mode is established in steps 62 or 66.

Following are examples that provide a more detailed description of the method steps performed by the CODEC 34 in response to different kinds communication devices operating at the originating and terminating ends of a call in accordance with the invention.

EXAMPLE ONE

64 Kbps Analog Modem to 64 Kbps Analog Modem Call

For this call, the originating and terminating ends of the call are 64 Kbps analog modems and the originating and terminating line cards support 64 Kbps communication. Call processing is as follows:

1. The originating analog modem goes off-hook and dials an analog modem-supported number;
2. The terminating analog modem answers;
3. A carrier tone (e.g., a conventional 2100 Hz echo canceling disablement signal) is exchanged between the modems. This carrier tone is detected by the line card CODECs, causing the following control logic functionality to be implemented in both the originating and terminating line cards:

3.1 The line card filters are disabled; and 3.2 A $Z_x$-law companding mode is selected; and
4. The usual modem call setup procedure is performed.

EXAMPLE TWO

64 Kbps Analog Modem to Non-64 Kbps Analog Modem Call

For this call, the originating end of the call includes a 64 Kbps analog modem and a 64 Kbps line card. The terminating end of the call is either a non-64 Kbps analog modem or the terminating line card lacks 64 Kbps modem support, or both. Call processing is as follows:

1. The originating 64 Kbps analog modem goes off-hook and dials an analog modem-supported number;
2. The terminating analog modem answers;
3. A carrier tone is exchanged between the modems. This carrier tone is detected by the originating POTS line card CODEC (and by the terminating line card CODEC if it supports 64 Kbps communication), causing the following control logic functionality to be implemented in the originating line card (and in the terminating line card if it supports 64 Kbps communication):

3.1 The line card filters are disabled; and 3.2 A $Z_x$-law companding mode is selected;
4. The $Z_x$-law codewords sent to the terminating end will not be converted to an intelligible analog signal if the terminating line card lacks 64 Kbps support, or will not be correctly interpreted by the terminating modem; and
5. Upon this failure, the line card(s) reset to the default $\mu$-law or A-law companding mode, and the modems restart their rate negotiation and connect at a lower speed.

EXAMPLE THREE

Non-64 Kbps Analog Modem to 64 Kbps Analog Modem Call

For this call, the originating end of the call is a non-64 Kbps analog modem and/or the originating line card does not support 64 Kbps communication. The terminating end of the call is a 64 Kbps analog modem and the terminating line card provides 64 Kbps modem support. Call processing is as follows:

1. The originating analog modem goes off-hook and dials an analog modem-supported number;
2. The terminating 64 Kbps analog modem answers;
3. A carrier tone is exchanged between the modems. This carrier tone is detected by the terminating POTS line card CODEC (and by the originating line card CODEC if it supports 64 Kbps communication), causing the following control logic functionality to be implemented in the terminating line card (and in the originating line card if it supports 64 Kbps communication):

3.1 The line card filters are disabled; and 3.2 A $Z_x$-law companding mode is selected;
4. The $Z_x$-law codewords sent to the originating end will not be converted to an intelligible analog signal if the originating line card lacks 64 Kbps support, or will not be correctly interpreted by the originating modem; and
5. Upon this failure, the line card(s) reset to the default $\mu$-law or A-law companding mode, and the modems restart their rate negotiation and connect at a lower speed.

EXAMPLE FOUR

64 Kbps Analog Modem to Digital Connection Modem Call

For this call, the originating end of the call is a 64 Kbps analog modem and the originating line card supports 64 Kbps communication. The terminating end of the call is a digital modem connected to the PSTN via a digital line (e.g., BRI) or a digital trunk (e.g., PRI). Call processing is as follows:

1. The originating 64 Kbps analog modem goes off-hook and dials a digital modem-supported number;
2. The terminating digital modem answers;
3. A carrier tone is exchanged between the modems. This carrier tone is detected by the CODEC in the originating line card, causing the following control logic functionality to be implemented in the originating line card:

3.1 The line card filters are disabled; and 3.2 A $Z_x$-law companding mode is selected;
4. The usual modem call setup procedure is then performed.

EXAMPLE FIVE

Voice Call Originating/Terminating on 64 Kbps Line Cards

For this call, the originating and terminating ends of the call are voice communication devices and the line cards support 64 Kbps communication. Call processing is as follows:

1. The originating analog voice device goes off-hook and dials a voice telephone number;
2. The terminating analog voice device answers;
3. No carrier tone is detected, causing the originating and terminating line cards to implement the default $\mu$-law or A-law companding mode; and
4. The usual voice setup procedure is performed.

Accordingly, a system and method have been described for supporting increased communication speed between data communication devices, including one or more high speed analog modems, connected to a digital communication network. In accordance with the invention, signal bandwidth, signal to noise ratio, frequency response and quantization distortion are no longer limiting factors for analog modem connection rates. By disabling the usual line card filtering, up to 1000 Hz of additional bandwidth may be obtained. The $Z_x$-law companding modes provided by the invention allows for a greater quantization range, per digit, in the conversion of the analog signal to digital PCM codewords. This greatly reduces the modem throughput sensitivity to the signal to noise ratio. Unlike 56 Kbps modem solutions where stronger signals are required to detect energy at higher frequencies, the $Z_x$-law companding modes according to the invention also provide better high frequency response. The proposed $Z_x$-law companding modes will also reduce the quantization distortion inherent in $\mu$-law and A-law companding when synchronization between analog modem and digital network signaling is used. Finally, the use of PAM in lieu of QAM in the uplink and downlink directions on the analog link allows the 64 Kbps modems to synchronize with the PCM codewords carried in the digital network.

While various embodiments of the invention have been disclosed, it should be apparent that many variations and alternative embodiments could be implemented in accordance with the invention. It is understood, therefore, that the invention is not to be in any way limited except in accordance with the spirit of the appended claims and their equivalents.

What is claimed is:

1. In a digital communication network providing telecommunication service between data communication devices, at least one of which is an analog modem communicating with the digital communication network via an analog signaling pathway that also supports voice communication, a method for implementing support for increased data communication speed between the data communication devices, comprising the steps of:

receiving notification that communication has been initiated between an originating communication device and a terminating communication device connected to the digital communication network;

determining whether said communication devices include an analog modem and another data communication device capable of communicating at the increased data communication speed, and if so, then:

a. adjusting, as necessary, the filtering present on any analog signaling pathway between the digital communication network and said data communication devices to allow an analog signaling bandwidth on said analog signaling pathway(s) that supports said increased data communication speed;

b. performing Analog-to-Digital Conversion (ADC) and Digital-to-Analog Conversion (DAC) to convert between the analog signals carried on said analog signaling pathway(s) and the digital signals carried over said digital communication network;

c. selecting an appropriate Z-law companding mode which is compatible with said increased data communication speed; and d. companding said digital signals in accordance with said selected Z-law companding mode.

2. A method in accordance with claim 1 wherein said increased data communication speed is approximately 64 Kbps.

3. A method in accordance with claim 1 wherein said determining step includes a first step of determining whether said communication devices include an analog modem and another data communication device, and a second step of determining whether said analog modem and said data communication device are capable of communicating at the increased data communication speed.

4. A method in accordance with claim 3 wherein said first determining step includes detecting a modem tone being exchanged between said communication devices.

5. A method in accordance with claim 4 wherein said modem tone is a tone for disabling echo cancellation in said analog pathway(s).

6. A method in accordance with claim 3 wherein said second determining step includes detecting a signal sent by one of said communication devices that is indicative of said communication devices being able to support said increased data communication speed or of one of said communication devices being unable to support said increased data communication speed.

7. A method in accordance with claim 1 wherein said adjusting step includes disabling analog filtering used during voice communications over said analog signaling pathway(s).

8. A method in accordance with claim 1 wherein said adjusting step includes disabling any analog filtering on said analog signaling pathway(s) that prevents an analog signaling bandwidth of at least approximately 4000 Hz.

9. A method in accordance with claim 1 wherein said companding step generates digital codewords representing substantially evenly spaced quantization points across the range of voltage levels present in said analog signals carried over said analog signaling pathway(s).

10. A method in accordance with claim 1 wherein said receiving, determining, adjusting, converting and companding steps are performed at a line card interface between said analog signaling pathway(s) and said digital communication network.

11. In a digital communication network providing telecommunication service between data communication devices, at least one of which is an analog modem communicating with the digital communication network via an analog signaling pathway that also supports voice communication across the digital communication network, a system for implementing support for increased data communication speed between the data communication devices, comprising:

means for receiving notification that communication has been initiated between an originating communication device and a terminating communication device connected to the digital communication network;

means for determining whether said communication devices include an analog modem and another data communication device capable of communicating at the increased data communication speed;

means for adjusting, as necessary, the filtering present on any analog signaling pathway between the digital communication network and said data communication devices to allow an analog signaling bandwidth on said analog signaling pathway(s) that supports said increased data communication speed;

means for performing Analog-to-Digital Conversion (ADC) and Digital-to-Analog Conversion (DAC) to convert between the analog signals carried on said analog signaling pathway(s) and the digital signals carried over said digital communication network;

means for selecting an appropriate Z-law commanding mode which is compatible with said increased data communication speed; and means for companding said digital signals in accordance with said selected Z-law companding mode.

12. A system in accordance with claim 11 wherein said increased data communication speed is approximately 64 Kbps.

13. A system in accordance with claim 11 wherein said determining means includes a first determining means for determining whether said communication devices include an analog modem and another data communication device, and a second determining means for determining whether said analog modem and said data communication device are capable of communicating at the increased data communication speed.

14. A system in accordance with claim 13 wherein said first determining means includes means for detecting a modem tone being exchanged between said communication devices.

15. A system in accordance with claim 14 wherein said modem tone is a tone for disabling echo cancellation in said analog pathway(s).

16. A system in accordance with claim 13 wherein said second determining means includes means for detecting a signal sent by one of said communication devices that is indicative of said communication devices being able to support said increased data communication speed or of one of said communication devices being unable to support said increased data communication speed.

17. A system in accordance with claim 11 wherein said adjusting means includes means for disabling analog filtering used during voice communications over said analog signaling pathway(s).

18. A system in accordance with claim 11 wherein said adjusting means includes means for disabling any analog filtering on said analog signaling pathway(s) that prevents an analog signaling bandwidth of at least approximately 4000 Hz.

19. A system in accordance with claim 11 wherein said companding means generates digital codewords representing substantially evenly spaced quantization points across the range of voltage levels present in said analog signals carried over said analog signaling pathway(s).

20. A system in accordance with claim 12, wherein said receiving, determining, adjusting, converting and companding means are implemented in a line card interface between said analog signaling pathway(s) and said digital communication network.

21. A line card for supporting 64 Kbps modem communication across a digital telecommunication network on behalf of a 64 Kbps analog modem that is connectable to said line card, comprising:

an analog circuit portion for receiving analog data signals from and providing analog data signals to said analog modem;

a digital circuit portion for receiving digital data signals from and providing digital data signals to the digital telecommunication network;

a pair of line filters for bandpass filtering said analog signals received from and provided to said analog modem;

an enCOder/DECoder (CODEC) including an Analog-to-Digital Converter (ADC) for converting analog signals provided from said analog circuit portion to digital signals that are provided to said digital circuit portion, said CODEC further including a Digital-to-Analog Converter (DAC) for converting digital signals provided from said digital circuit portion to analog signals that are provided to said analog circuit portion;

a pair of programmable compression and expansion circuits for respectively compressing and expanding (companding) said digital signals according to one of several Z-law companding modes that include a linear Z-law companding mode and a nonlinear Z-law companding mode;

said programmable circuits and said line filters being controlled by a control logic circuit that further includes:

first control means responsive to a first modem tone being detected following said analog modem going off-hook for disabling said line filters and configuring said programmable circuits to perform $Z_x$-law companding over a range of quantization levels determined from noise present in said analog circuit portion and from a maximum permissible power level in said analog circuit portion; and second control means responsive to a second modem tone being detected indicating that said analog modem is communicating with a data communication device that is not capable of 64 Kbps communication for configuring said programmable circuits to perform $\mu$-law or A-law companding.

* * * * *